United States Patent
Michniewicz

(10) Patent No.: US 9,267,609 B2
(45) Date of Patent: Feb. 23, 2016

(54) VALVE HAVING A SENSOR TO DETERMINE AN ANGLE OF ROTATION OF A VALVE FLAP

(75) Inventor: Daniel Michniewicz, Jeżów Sudecki (PL)

(73) Assignee: Continental Automotive GmbH, Hannover (DE)

( * ) Notice: Subject to any disclaimer, the term of this patent is extended or adjusted under 35 U.S.C. 154(b) by 313 days.

(21) Appl. No.: 13/994,935

(22) PCT Filed: Dec. 13, 2011

(86) PCT No.: PCT/EP2011/072517
§ 371 (c)(1),
(2), (4) Date: Sep. 9, 2013

(87) PCT Pub. No.: WO2012/080203
PCT Pub. Date: Jun. 21, 2012

(65) Prior Publication Data
US 2013/0341543 A1    Dec. 26, 2013

(30) Foreign Application Priority Data

Dec. 17, 2010    (DE) .......................... 10 2010 055 046

(51) Int. Cl.
*F02D 9/08*    (2006.01)
*F02D 11/04*    (2006.01)
(Continued)

(52) U.S. Cl.
CPC .............. *F16K 31/043* (2013.01); *F02D 9/105* (2013.01); *F02D 9/107* (2013.01); *F02D 9/1065* (2013.01); *F02D 2009/0294* (2013.01)

(58) Field of Classification Search
CPC ................ F02D 11/106; F02D 11/108; F02D 2009/0294; F02D 2250/16; F02D 9/105; F02D 9/1065; F02D 9/107; F16K 1/22; F16K 27/0218; F16K 31/043
USPC .......... 123/337, 361, 399, 400; 137/554, 556; 251/129.04, 304–308; 73/114.36
See application file for complete search history.

(56) References Cited

U.S. PATENT DOCUMENTS 4,295,593 A * 10/1981 Kensrue .......................... 228/50
4,773,995 A * 9/1988 Kondo .......................... 210/222
(Continued)

FOREIGN PATENT DOCUMENTS

DE    10 2006 044 855    4/2008
EP    1 307 676    5/2003
(Continued)

OTHER PUBLICATIONS

Machine translation of col. 2, lines 2-14 of JPY61007797, Ogishima, Mar. 1986.*

*Primary Examiner* — John K Fristoe, Jr.
*Assistant Examiner* — Seth W Mackay-Smith
(74) *Attorney, Agent, or Firm* — Cozen O'Connor

(57) ABSTRACT

A valve having a housing, a flap rotatably arranged in the housing and connected to a drive shaft mounted in the housing, an electric motor for driving the drive shaft, having a gearing which has at least one toothed segment and which is arranged between the electric motor and the drive shaft, and a sensor, which has a magnet, for determining the angle of rotation of the flap. The toothed segment has at least two detent hooks that engage around the magnet. Furthermore, at least one spring element is provided which preloads the magnet against the detent hooks.

8 Claims, 3 Drawing Sheets

(51) Int. Cl.

| | |
|---|---|
| *F16K 37/00* | (2006.01) |
| *F17D 3/18* | (2006.01) |
| *F16K 31/04* | (2006.01) |
| *F16K 1/22* | (2006.01) |
| *F16K 5/00* | (2006.01) |
| *F02D 9/10* | (2006.01) |
| *F02D 9/02* | (2006.01) |

(56) References Cited

U.S. PATENT DOCUMENTS

| | | | |
|---|---|---|---|
| 6,288,534 B1 * | 9/2001 | Starkweather et al. | 324/207.2 |
| 6,705,346 B2 | 3/2004 | Kordon | |
| 6,879,150 B2 * | 4/2005 | Sekiya | 324/207.25 |
| 7,019,516 B2 * | 3/2006 | Tokunaga et al. | 324/207.25 |
| 7,111,602 B2 * | 9/2006 | Sturdy et al. | 123/184.53 |
| 7,798,121 B2 | 9/2010 | Hellinger et al. | |
| 8,933,691 B2 * | 1/2015 | Galka et al. | 324/207.25 |
| 2001/0002599 A1 * | 6/2001 | Apel et al. | 137/554 |
| 2005/0211215 A1 | 9/2005 | Sturdy et al. | |
| 2008/0191692 A1 * | 8/2008 | Buerger | 324/207.25 |

FOREIGN PATENT DOCUMENTS

| | | | |
|---|---|---|---|
| JP | Y61007797 | * | 3/1986 |
| WO | WO 2005/026598 | | 3/2005 |

\* cited by examiner

VALVE HAVING A SENSOR TO DETERMINE AN ANGLE OF ROTATION OF A VALVE FLAP

CROSS REFERENCE TO RELATED APPLICATIONS

This is a U.S. national stage of application No. PCT/EP2011/072517, filed on 13 Dec. 2011. Priority is claimed on German Application No. 10 2010 055 046.9 filed 17 Dec. 2010, the content of which is incorporated here by reference.

BACKGROUND OF THE INVENTION

1. Field of the Invention

The object of the invention is a valve with a housing, a flap arranged rotatably in the housing and connected with a drive shaft mounted in the housing, an electric motor for driving the drive shaft, a gearing which has at least one toothed segment arranged between the electric motor and the drive shaft, and a sensor that has a magnet for determining the angle of rotation of the flap.

2. Description of the Prior Art

Such valves are used as throttle valves in motor vehicles and are well known. To determine an opening angle of the flap, it is necessary to determine an angle of rotation of the flap. For this, position sensors are used that work with magnets. For the arrangement of the magnets it is known to arrange them on the drive shaft for the flap or on a toothed segment of the gearing. In order to guarantee a play-free fixing of the magnet, even at high temperatures and with the vibrations present in the engine bay, it is known to attach the magnet by molding plastic onto a shaft or toothed segment around the magnet. For this, the magnet is laid in the injection mold for the shaft or toothed segment and then molded around with plastic to form the finished component. Such injection molds with the magnet as insert are particularly difficult to configure and are therefore cost-intensive.

SUMMARY OF THE INVENTION

One embodiment of the invention is a valve that allows a simple and economic arrangement of a magnet for the sensor.

According to one embodiment of the invention the toothed segment has at least two detent hooks that engage around the magnet, and that at least one spring element is arranged that preloads the magnet against the detent hooks.

By preloading the magnets against the detent hooks by at least one spring element, a play-free arrangement of the magnet in the toothed segment is achieved, which guarantees a reliable fixing of the magnet in the valve under all operating conditions. Also the use of spring elements allows compensation for tolerances, which further simplifies production of the magnet and also the toothed segment. No additional fixing, for example gluing or spray molding, is required.

To reliably avoid tilting of the magnet under load, in an advantageous embodiment three detent hooks are provided.

The detent hooks can be attached to the toothed segment as separate components. An economic embodiment however lies in forming the detent hooks integrally with the toothed segment. In particular in the case of a toothed segment as a plastic injection molding, the detent hooks can be produced at low cost.

In another advantageous embodiment the spring elements are formed integrally with the toothed segment. By a targeted configuration in relation to thickness and length of the spring element, the spring constant can be selected in a targeted fashion such that the spring elements can be adapted precisely to the conditions of use because of the matched configuration.

Integration of the spring element in the toothed segment avoids the need for additional components to be mounted.

In a particularly simple embodiment the toothed segment has a central recess corresponding to the dimension of the magnet, and the spring elements are formed as moldings pointing radially towards the middle point of the toothed segment and protruding into the central recess.

In another embodiment the spring element is a separate spring, preferably a coil spring or leaf spring. The arrangement of one or more separate springs has the advantage that the toothed segment is formed more simply. This embodiment therefore allows the use of conventional toothed segments without integral spring elements.

A secure positioning of the magnet and a mounting aid to guarantee correct installation are achieved according to a further embodiment in that on the side facing away from the toothed segment, the magnet has radially distributed shoulders in which the detent hooks engage. Insofar as the radially distributed shoulders are larger than the engaging detent hooks, this embodiment allows compensation for tolerances in the radial direction.

BRIEF DESCRIPTION OF THE DRAWINGS

The invention is now explained in more detail with reference to two embodiment examples. Here.

DETAILED DESCRIPTION OF THE PREFERRED EMBODIMENTS

Figure 1:
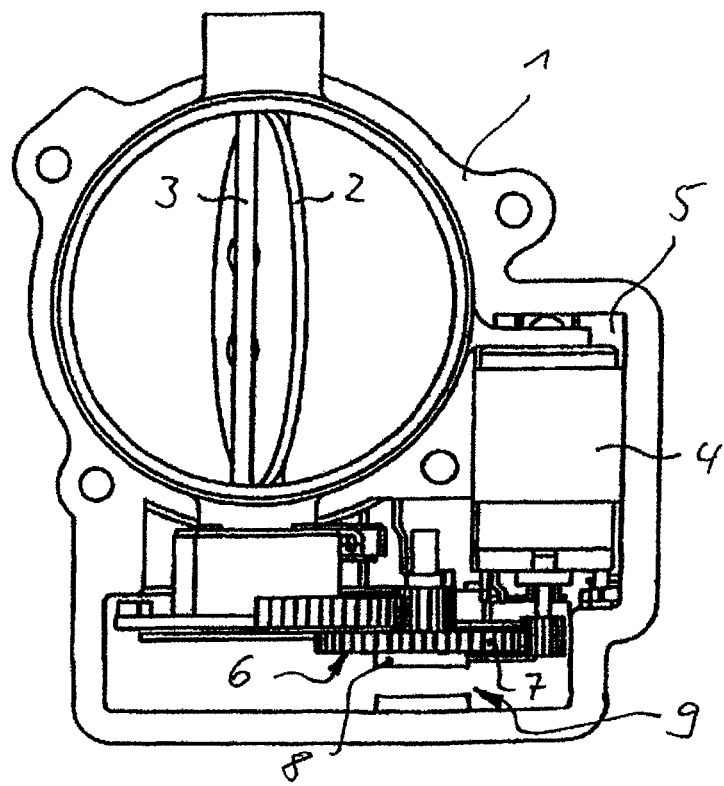
FIG. 1 is a valve.

The valve in FIG. 1 has a housing 1, a flap 2 arranged rotatably in a housing 1 and connected to a drive shaft 3 mounted in the housing 1. To drive the drive shaft 3, an electric motor 4 is provided, which is arranged in a separate chamber 5 of the housing 1. The rotary motion of the electric motor 4 is transmitted to the drive shaft 3 via a gearing 6. On a toothed segment 7 of the gearing 6 is arranged a magnet 8 of a sensor 9 is arranged that is configured to determine the angle of rotation of the flap 2.

Figure 2:
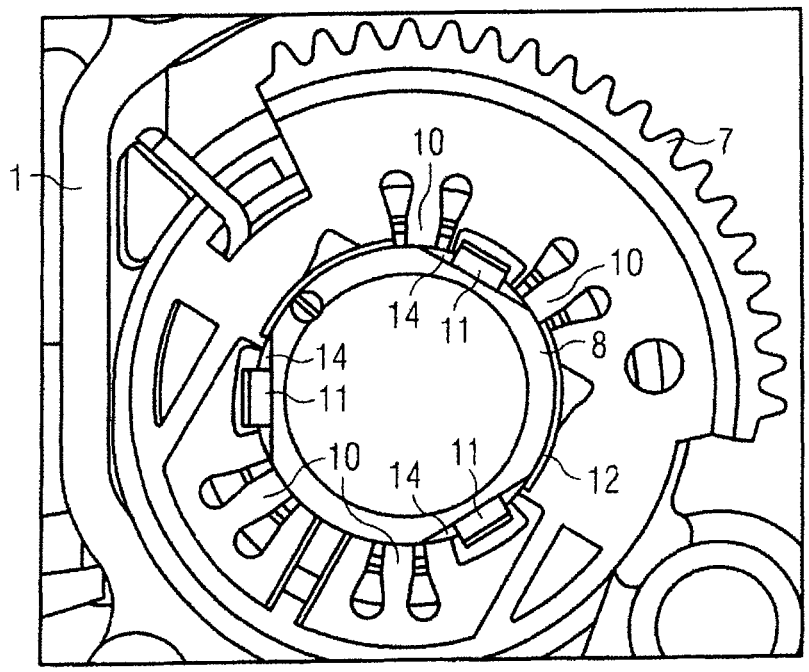
FIG. 2 is a top view of a toothed segment.

FIG. 2 shows the toothed segment 7 of the gearing 6 according to FIG. 1 with the magnet 8 arranged centrally. The toothed segment 7 is made of plastic and is produced by injection molding. The magnet 8 is held on the toothed segment 7 in that four spring elements 10 preload the magnet 8 against three detent hooks 11. Both the spring elements 10 and the detent hooks 11 are formed integrally on the toothed segment 7. While the detent hooks 11 are arranged vertically with respect to the plane of the toothed segment 7, the spring elements 10 are moldings pointing radially towards the middle point of the toothed segment 7 and protruding into the central recess 12, which moldings in the region of the magnet 8 each have a segment 13 (FIG. 3) formed vertically thereto which comes to rest on the magnet 8. On its side facing the detent hooks 11, the magnet 8 has radially distributed shoulders 14 in which the detent hooks 11 engage. The shoulders 14 are larger in their dimensions than the detent hooks 11 so compensation for tolerances is possible.

Figure 3:
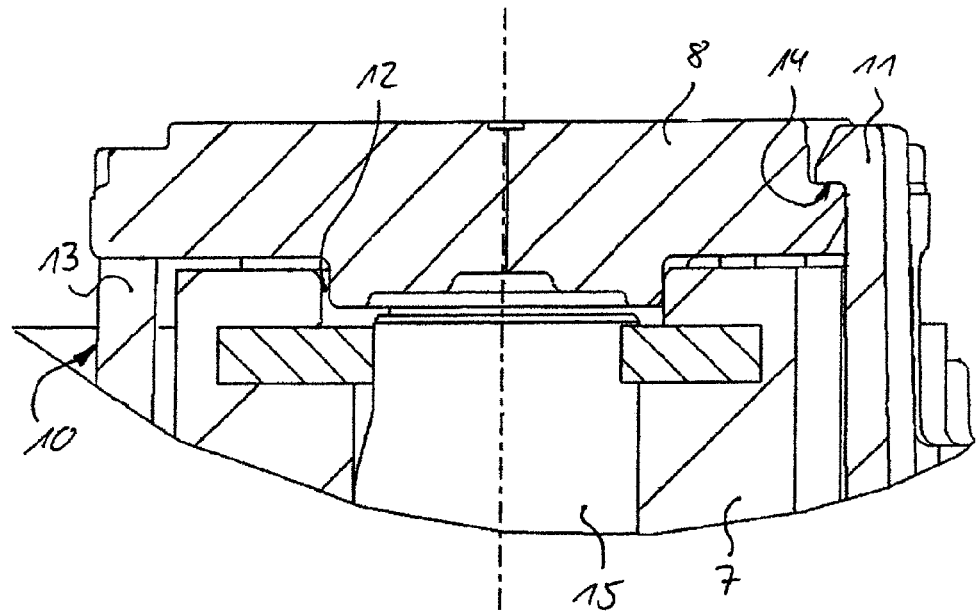
FIG. 3 is a section through the magnet in FIG. 2.

The section according to FIG. 3 shows the magnet 8 with a shoulder 14 in which a detent hook of the toothed segment 7 engages. The magnet 8 is preloaded against the detent hooks 11 by the vertical segment 13 of a spring element 10. The toothed segment 7 is arranged on a shaft 15.

Figure 4:
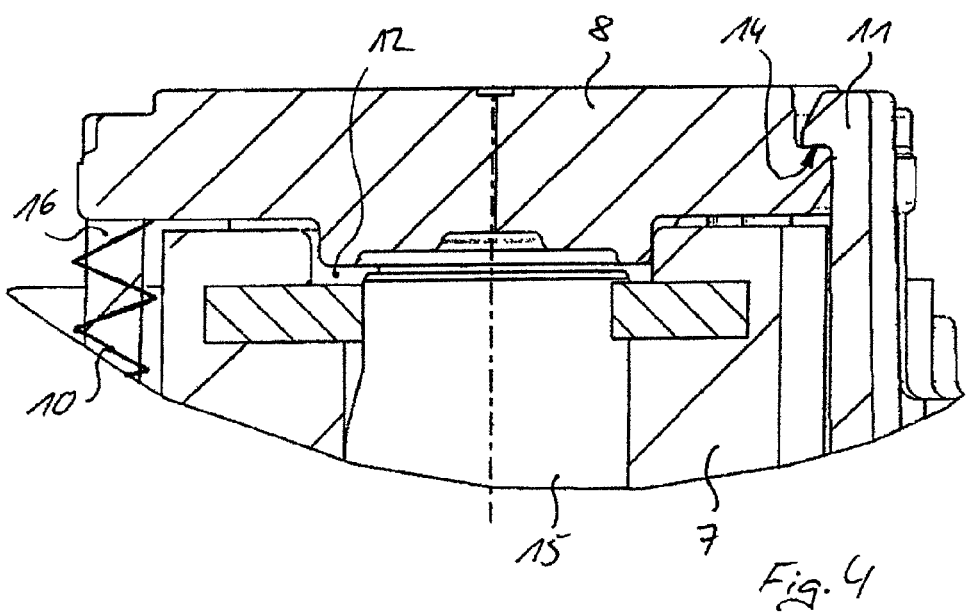
FIGS. 4, 5 are further embodiments of the valve.
Figure 5:
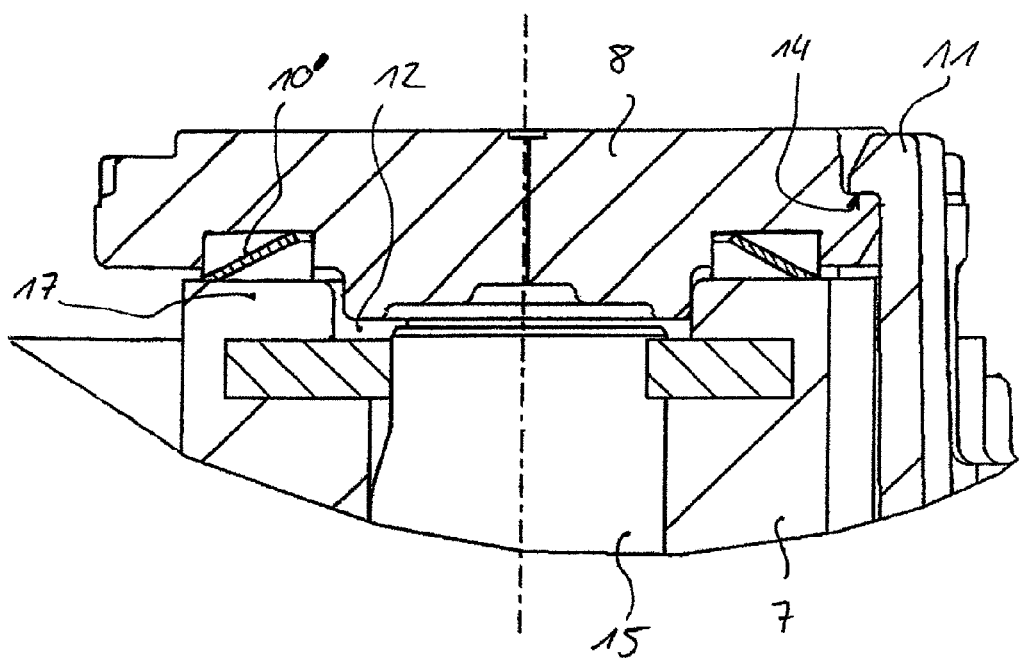

In FIG. 4, coil springs 10 are provided as spring elements 10, wherein each coil spring 10 has a dome 16 for guidance. Only one spring element 10 is required in an arrangement according to FIG. 5. The spring element 10' is formed as a leaf spring 10'. The leaf spring 10' rests on a hub 17 of the toothed segment 7 and preloads the magnet 8 against the detent hooks 11.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A valve comprising:
    a housing;
    a drive shaft mounted in the housing;
    a flap which is arranged rotatably in the housing and connected to the drive shaft;
    an electric motor configured to drive the drive shaft;
    a sensor having a magnet and configured to determine an angle of rotation of the flap;
    a gearing arranged between the electric motor and the drive shaft and having at least one toothed segment, the at least one toothed segment having at least two detent hooks configured to engage around the magnet; and
    a spring element configured to preload the magnet against the at least two detent hooks,
    wherein the at least one toothed segment has a central recess dimensioned to accept the magnet, and
    wherein the spring element is formed as a molding pointing radially towards a middle point of the at least one toothed segment and protruding into the central recess.

2. The valve as claimed in claim 1, wherein three detent hooks are provided.

3. The valve as claimed in claim 2, wherein the three detent hooks are formed integrally with the at least one toothed segment.

4. The valve as claimed in claim 1, wherein the at least two detent hooks are formed integrally with the at least one toothed segment.

5. The valve as claimed in claim 1, wherein the spring element is formed integrally with the at least one toothed segment.

6. The valve as claimed in claim 1, wherein the spring element is a separate spring configured as one of a coil spring and a leaf spring.

7. The valve as claimed in a claim 1, wherein the magnet has a radially distributed shoulder in which the at least two detent hooks engage.

8. The valve as claimed in claim 7, wherein the radially distributed shoulder is larger than the at least two detent hooks.

* * * * *